United States Patent
Nakano

(10) Patent No.: US 6,655,694 B1
(45) Date of Patent: Dec. 2, 2003

(54) SLIDE RING SEAL

(75) Inventor: Kenji Nakano, Weinheim (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/540,174

(22) Filed: Mar. 31, 2000

(30) Foreign Application Priority Data

Apr. 1, 1999 (DE) .......................................... 199 14 930

(51) Int. Cl.$^7$ ................................................ F16J 15/36
(52) U.S. Cl. ........................ 277/370; 277/390; 277/393
(58) Field of Search ................................ 277/358, 370, 277/377, 379, 361, 362

(56) References Cited

U.S. PATENT DOCUMENTS

| | | | | |
|---|---|---|---|---|
| 2,785,913 A | * | 3/1957 | Solari ........................ 277/391 |
| 3,554,559 A | * | 1/1971 | Dahlheimer ................ 277/348 |
| 3,712,765 A | * | 1/1973 | Smith | |
| 4,275,889 A | * | 6/1981 | Butler et al. ............... 277/375 |
| 4,337,628 A | * | 7/1982 | Greene | |
| 4,451,049 A | * | 5/1984 | Charhut ...................... 277/374 |
| 4,586,719 A | * | 5/1986 | Marsi et al. ................ 277/385 |
| 4,779,876 A | * | 10/1988 | Novosad | |
| 4,973,224 A | * | 11/1990 | Pesch ........................ 277/397 |
| 5,114,163 A | * | 5/1992 | Radosav et al. | |
| 5,123,660 A | * | 6/1992 | Dahlheimer et al. | |
| 5,199,719 A | * | 4/1993 | Heinrich et al. | |
| 5,199,720 A | * | 4/1993 | Radosav et al. | |
| 5,375,852 A | * | 12/1994 | Charhut ...................... 277/371 |
| 5,490,682 A | * | 2/1996 | Radosav et al. | |
| 5,716,054 A | * | 2/1998 | Duffee et al. | |
| 5,797,602 A | * | 8/1998 | Less | |
| 5,893,564 A | * | 4/1999 | Yang ........................... 277/374 |
| 5,961,122 A | * | 10/1999 | Marsi | |

* cited by examiner

*Primary Examiner*—Anthony Knight
*Assistant Examiner*—Vishal Patel
(74) *Attorney, Agent, or Firm*—Kenyon & Kenyon

(57) ABSTRACT

A slide ring seal, including a slide ring and a counter-ring, the slide ring and the counter-ring sealingly contacting each other so as to be relatively rotatable at their sealing surfaces and so as to be acted upon by spring tension under axial prestressing. The slide ring, via a sealing ring, is sealingly connected to a drive ring in a rotatably fixed manner. The sealing ring is arranged between the slide ring and the drive ring, without adhering. The slide ring, the sealing ring, and the drive ring constitute a preassemblable unit, and the unit on the exterior peripheral side is enclosed by a housing flange under radial prestressing in a rotatably fixed manner.

7 Claims, 1 Drawing Sheet

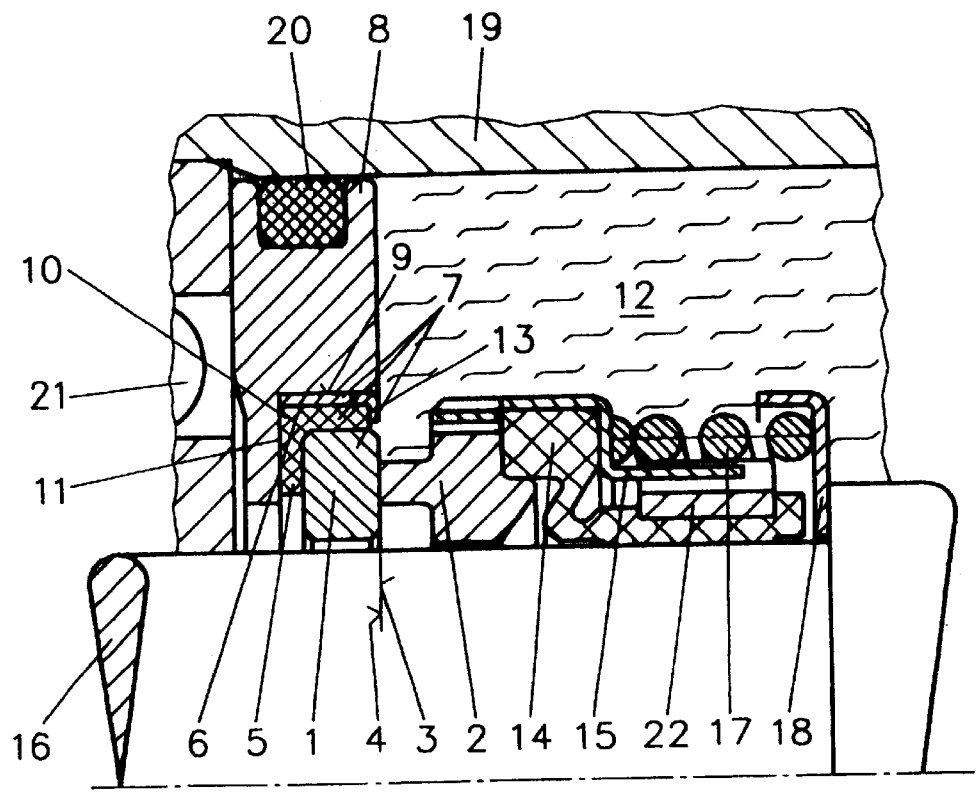

SLIDE RING SEAL

BACKGROUND OF THE INVENTION

The invention relates to a slide ring seal, including a slide ring and a counter-ring, the slide ring and the counter-ring sealingly contacting each other so as to be relatively rotatable at their sealing surfaces and so as to be acted upon by spring tension under axial prestressing. The slide ring, via a sealing ring, is sealingly connected to a drive catch ring in a rotatably fixed manner.

Slide ring seals of this type are generally known. In this context, however, it should be noted that the sealing ring and the drive ring are vulcanized to each other, which is unsatisfactory from a production technical and an economic point of view.

SUMMARY OF THE INVENTION

The invention is based on the objective of refining a slide ring seal of the type mentioned above such that, from a production technical and economic point of view, it can be manufactured more simply and cost effectively, and that the components of the slide ring seal, with a view towards reutilization subsequent to their normal use, can be separated and clearly sorted without difficulty.

In order to achieve this objective, provision is made that the sealing ring is arranged, without adhering, between the slide ring and the drive ring. The slide ring, the sealing ring, and the drive ring constitute a preassemblable unit, and the unit on the exterior peripheral side is enclosed by a housing flange under radial prestressing in a rotatably fixed manner.

In one embodiment of this type, it is advantageous that the components of the preassemblable unit can first be manufactured separately from each other and be combined into the preassemblable unit only after their individual manufacture. The preassembled unit is then pressed into the bore hole of the housing flange, the exterior peripheral side of the drive ring contacting the housing flange so as to touch it directly. Through a force fit brought about in this manner, high radial prestressings on the slide ring can be achieved. Thus the slide ring, as a component of the unit, reliably rotates together with the housing flange; a relative twisting between the slide ring and a sealing ring is dependably excluded.

The wall of the housing flange, bordering the installation space of the unit, and the sealing ring are both configured, for receiving the slide ring, so as to be essentially L-shaped and open in the direction of the medium to be sealed off. As a result of the L-shaped configuration of the sealing ring, direct contact is avoided between the impact-sensitive slide ring and the also inflexible housing flange. The congruent configuration of the wall bordering the installation space makes possible a good support of the sealing ring on its sides facing away from the slide ring.

In accordance with one advantageous embodiment, provision can be made that the drive ring have a drive flange and that the drive flange essentially completely overlaps the side of the sealing ring facing the medium to be sealed off. For example, if gasoline is used as the medium to be sealed off, then, as a result of the essential overlapping of the free surfaces of the sealing ring by the drive flange, a swelling of the sealing ring and a resulting spreading of the free surfaces is substantially prevented/reduced to a minimum. As a result, over a long service life, to a great extent irrespective of the medium to be sealed off, an invariably rotatably fixed coordination of the slide ring to the drive ring is assured.

The sealing ring, as a result of the described configuration of the drive flange, has virtually no free surfaces which could come in contact with the medium to be sealed off. A swelling of the material of the sealing ring is thus reduced to minimum. In any case, a configuration of this type reliably prevents the prestressing of the sealing ring between the slide ring and the drive ring from being reduced due to a swelling of the respective sealing ring and a spreading of the free surfaces, and thus the danger that the slide ring will twist relative to the sealing ring. Therefore, a rotatably-fixed allocation of the slide ring to the drive ring is always reliably ensured.

For example, if gasoline is used as the medium to be sealed off, the sealing ring, without the drive flange which keeps the sealing ring in its shape, would swell up and spread with increasing service life of the slide ring seal.

The sealing ring is made of an incompressible material. A slight swelling of the sealing ring, as a result of the fact that the material of the sealing ring cannot spread due to the drive flange, brings about an intensified, elastic prestressing between the slide ring and the drive ring.

The sealing ring is preferably made of a polymer material, for example FKM (fluoropolymerizate). The slide ring, in contrast, is made mostly of a brittle material such as carbon, which at its sealing surface contacts a counter-ring made, for example, of silicon carbide. The drive ring is preferably made of a rust-proof metallic material.

The end face of the sealing ring facing the medium to be sealed off can sealingly contact the drive flange under elastic prestressing. In this context, it is advantageous that a swelling of the sealing ring, in response to the impingement of the medium to be sealed off, is prevented. An impingement of the sealing ring by the medium to be sealed off, as a result of the sealing ring being inserted into the drive ring, brings about an increasing prestressing on the slide ring.

BRIEF DESCRIPTION OF THE DRAWINGS

One exemplary embodiment of a slide ring seal constructed according to the principles of the invention is schematically illustrated in the FIGURE.

DETAILED DESCRIPTION OF THE INVENTION

In the FIGURE, an exemplary embodiment of the slide ring seal is depicted. The slide ring seal is essentially composed of slide ring 1 made of carbon, which at its planar sealing surface 3 is supported, in an elastically sealing manner, on planar sealing surface 4 of counter-ring 2, which is made of silicon carbide, under axial prestressing.

Slide ring 1 is encircled by L-shaped sealing ring 5, which in this exemplary embodiment is made of FKM.

The metal components of the slide ring seal are made of high-grade steel and are resistant to medium 12 to be sealed off, for example gasoline.

Counter-ring 2, via a bellows 14 which, like sealing ring 5, is also made of FKM, is connected in a rotatably fixed manner to an angle sheet iron 15 configured as a housing. Bellows 14 is pressed by clamping ring 22 onto the surface of shaft 16, pressure spring 17 being supported in the axial direction on one side on a radial flange of angle sheet iron 15 and in the axial direction on the other side on a spring support ring 18.

In contrast, slide ring 1 is encircled by sealing ring 5 without adhering, slide ring 1, sealing ring 5, and drive ring 6 constituting the preassemblable unit 7 and being pressed into the bore hole of a housing flange 8.

The sealing results from the fact that planar sealing surfaces 3, 4, acted upon by spring tension, contact slide ring 1 and counter-ring 2.

Drive ring 6, made of high-grade steel, has a drive flange 13, which is configured as a radial flange and essentially completely overlaps the end face of sealing ring 5 facing counter-ring 2. As a result, a swelling of sealing ring 5 during the normal use of the slide ring seal is avoided, as is thus also any associated reduction of the radial prestressing under which slide ring 1 is encircled by sealing ring 5. If, however, the slight impingement of sealing ring 5 by medium 12 to be sealed off causes a swelling, then the radial prestressing between slide ring 1 and drive ring 6 is increased because the respective volume of the installation space of sealing ring 5 is essentially constant, and sealing ring 5, in response to swelling, is unable to spread due to drive flange 13.

Housing flange 8 in this exemplary embodiment is pressed into pump housing 19 of a gasoline pump and is sealed off by an O-ring 20 made of FKM. Housing flange 8, at its end face facing away from medium 12 to be sealed off, contacts the housing of a roller bearing 21.

What is claimed is:

1. A slide ring seal that seals a shaft and a medium to be sealed off, comprising:

a carbon slide ring having a sealing surface;

a counter-ring having a sealing surface facing the sealing surface of the slide ring along which sealing surfaces the slide ring and the counter-ring sealingly contact each other under uniaxial spring prestress so as to permit relative rotation therebetween;

a drive ring having an exterior peripheral side and a drive flange;

a sealing ring, having a side that faces the medium to be sealed off, sealingly connecting the slide ring to the drive ring without adhering to either the slide ring or to the drive ring, wherein the drive flange of the drive ring essentially completely overlaps the side of the sealing ring that faces the medium to be sealed off;

wherein the slide ring, the sealing ring, and the drive ring constitute a preassemblable unit, wherein the exterior peripheral side of the drive ring constitutes an exterior peripheral side of the preassembled unit, which unit is enclosed by a housing flange under radial prestressing in a rotatably fixed manner.

2. The slide ring seal as recited in claim 1, wherein the sealing ring is made of a polymer material.

3. The slide ring seal as recited in claim 1, wherein the drive ring is made of a metallic material.

4. The slide ring seal as recited in claim 1, wherein the sealing ring sealingly contacts the drive flange under elastic prestressing.

5. The slide ring seal as recited in claim 1, wherein the sealing ring is made of a polymer material.

6. The slide ring seal as recited in claim 1, wherein the drive ring is made of a metallic material.

7. A slide ring seal, comprising:

a slide ring having a first sealing surface;

a counter-ring having a second sealing surface facing the first sealing surface of the slide ring, the slide ring and the counter-ring sealingly contacting one another the first and second sealing surfaces, relative rotation between the slide ring and the counter-ring being permitted;

a drive ring having a drive flange; and a sealing ring sealingly connecting the slide ring to the drive without adhering to the slide ring and the drive ring; and a housing flange, an exterior peripheral side of the drive ring contacting the housing flange;

wherein the drive flange of the drive ring overlaps a side of the sealing ring facing a medium to be sealed off, and wherein a wall of the housing flange defines an installation space, and the wall and the sealing ring are essentially L-shape and open in a direction of the medium to be sealed off.

* * * * *

UNITED STATES PATENT AND TRADEMARK OFFICE
CERTIFICATE OF CORRECTION

PATENT NO. : 6,655,694 B1
DATED : December 2, 2003
INVENTOR(S) : Kenji Nakano

It is certified that error appears in the above-identified patent and that said Letters Patent is hereby corrected as shown below:

Column 4,
Line 6, after "fixed manner" insert -- , wherein the exterior peripheral side of the drive ring contacts the housing flange, and wherein a wall of the housing flange defines an installation space of the unit and wherein the wall and the sealing ring are both configured so as to essentially L-shaped, open in the direction of the medium to be sealed off, for receiving the sliding ring --.
Line 37, change "L-shape" to -- L-shaped --.

Signed and Sealed this

Fourteenth Day of December, 2004

JON W. DUDAS
*Director of the United States Patent and Trademark Office*